United States Patent [19]

Parsons

[11] Patent Number: 5,101,680

[45] Date of Patent: Apr. 7, 1992

[54] INHIBITOR FOR A MANUAL TRANSMISSION SHIFT CONTROL

[75] Inventor: George A. Parsons, Grosse Pointe, Mich.

[73] Assignee: General Motors Corporation, Detroit, Mich.

[21] Appl. No.: 732,890

[22] Filed: Jul. 19, 1991

[51] Int. Cl.⁵ .......................... G05G 9/16; B60K 20/02
[52] U.S. Cl. .......................................... 74/475; 74/878
[58] Field of Search ............... 74/335, 473 R, 475, 74/878

[56] References Cited

U.S. PATENT DOCUMENTS

| | | | |
|---|---|---|---|
| 3,874,248 | 4/1975 | Hauser et al. ........................ | 74/475 |
| 4,126,054 | 11/1978 | Langford et al. ..................... | 74/475 |
| 4,328,712 | 5/1982 | Osborn ............................... | 74/475 X |
| 4,605,109 | 8/1986 | Fakuchi et al. ...................... | 74/475 X |
| 4,807,489 | 2/1989 | Shreiner et al. ...................... | 74/475 |
| 4,880,092 | 11/1989 | Kito et al. ........................... | 74/475 X |
| 4,920,815 | 5/1990 | Reynolds .............................. | 74/335 |
| 5,003,799 | 4/1991 | Imai et al. ........................... | 74/878 X |

Primary Examiner—Dwight Diehl
Attorney, Agent, or Firm—Donald F. Scherer

[57] ABSTRACT

An inhibitor for a manual transmission shift control which aids in preventing unintended downshifts into first gear. The inhibitor blocks shifting from second gear to first gear following a first gear to second gear shift. No other shift sequence is affected.

4 Claims, 3 Drawing Sheets

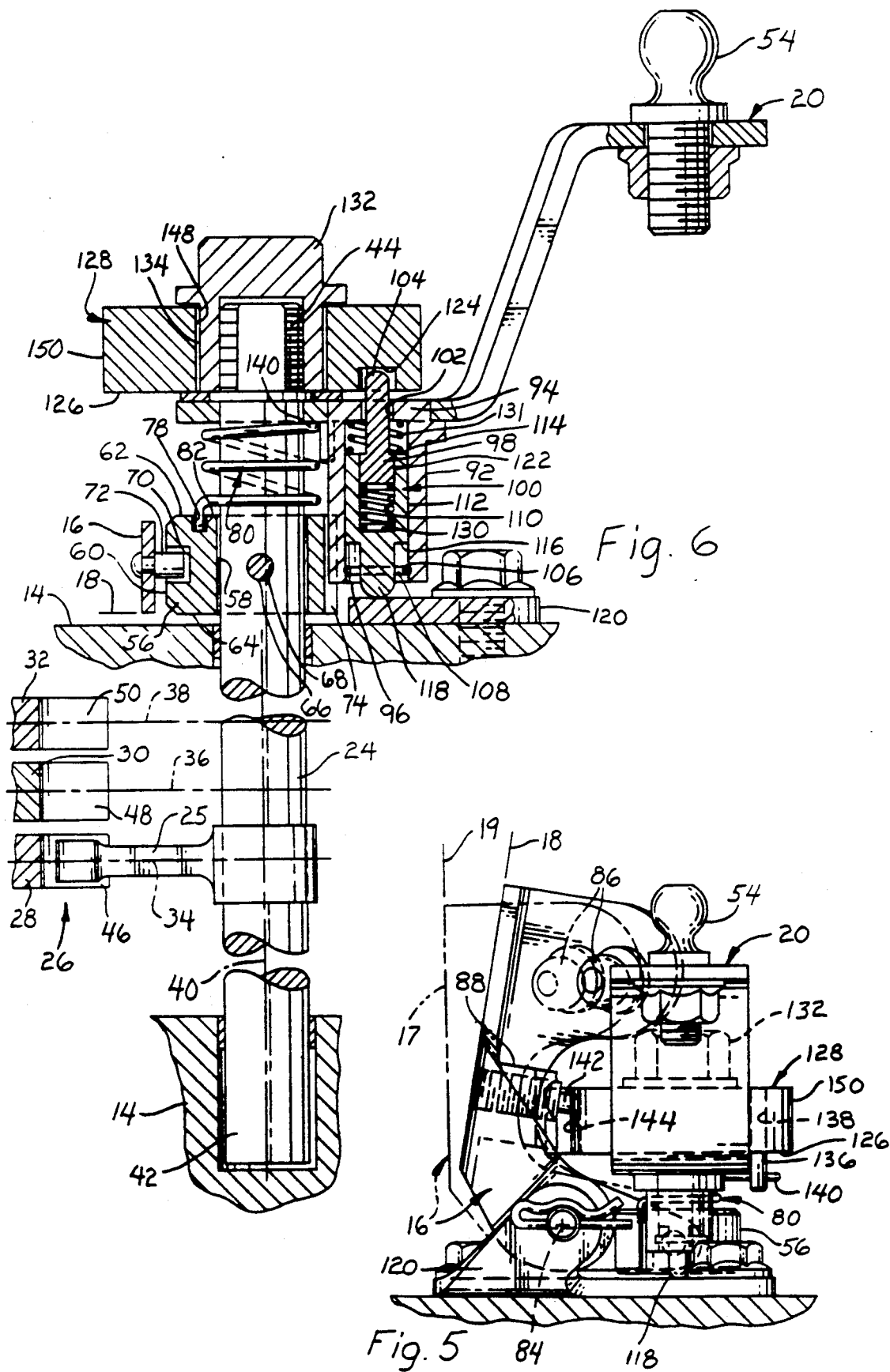

INHIBITOR FOR A MANUAL TRANSMISSION SHIFT CONTROL

TECHNICAL FIELD

The present invention relates to shift mechanisms for manual transmissions in motor vehicles. More particularly, this invention relates to shift mechanisms with a shift shaft largely internal to a transmission housing for making gear range selections. Axial displacement of the shift shaft is used to select the desired gear range. Rotary displacement of the shift shaft is used to engage the desired gear. A select lever external to the transmission housing is used to axially displace the shift shaft. A shift lever, also external to the transmission housing, is used to rotatively displace the shift shaft.

BACKGROUND OF THE INVENTION

Conventional shift mechanisms for manual transmissions permit shifting from second gear to first gear when it is desired to shift from second gear to third gear. Synchronizers within the transmission can provide some resistance to downshifting, but that resistance can be overcome by the vehicle operator.

SUMMARY OF THE INVENTION

The present invention blocks a shift from second gear to first gear when the last preceding shift is a first gear to second gear shift. The transmission can be shifted into any gear except first. No other shift sequence is restricted.

It is an object of this invention to inhibit shifting to first gear after a first gear to second gear shift.

It is also an object of this invention to provide a device which restricts shifting to first gear after a first gear to second gear shift.

It is further an object of this invention to provide a mechanism for a transmission having a shift lever, a select lever rotatively mounted to a transmission housing, and a shift shaft which blocks shifting from second gear into first gear after a first gear to second gear shift.

These and other objects and advantages will be more apparent from the following description and drawings.

DESCRIPTION OF THE DRAWINGS

FIG. 1 shows the shift lever in the neutral position and the select lever in the 1-2 gear range position with the shift lever disengaged from the shift lever cam.

FIG. 2 shows the shift lever in the first gear position and the select lever in the 1-2 gear range position after a neutral to first gear shift.

FIG. 3 shows the shift lever in the neutral position and the select lever in the 1-2 gear range position and the shift lever in Neutral after being shifted from first gear to neutral.

FIG. 4 shows the shift lever in second gear after being shifted from first to neutral to second gear while maintaining the select lever in the 1-2 gear range position.

FIG. 5 shows a side view of the shift control in the direction of arrows 5 of FIG. 3.

FIG. 6 shows a sectional view of the shift control in the direction of arrows 6 of FIG. 3.

DESCRIPTION OF THE PREFERRED EMBODIMENT

Figure 1:
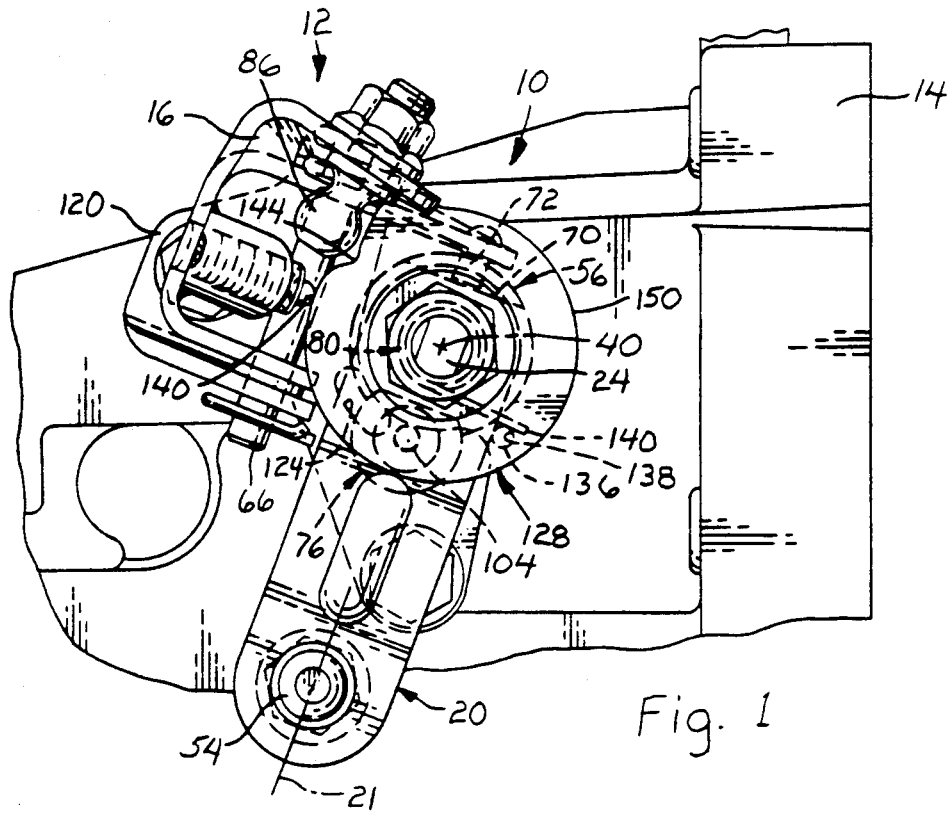
FIGS. 1-4 show the parts of the shift control attaching to the shift shaft from the distal end of the shift shaft. Each figure shows the parts in different relative positions which correspond to particular gear positions.

FIGS. 1-6 all show an inhibitor 10 for a manual transmission shift control 12, located on the exterior of a transmission housing 14. The transmission has a plurality of drive gears, including but not limited to a first gear and a second gear as well as neutral where no drive gears are engaged. FIGS. 1-4 show the relative positions of the elements of the inhibitor 10 as the transmission is shifted from neutral to first gear and then from first gear to second gear. FIG. 5 highlights the rotatable operation of a select lever 16, showing the lever in a 1-2 gear range position 18 and a phantom outline 17 of the select lever 16 in a 3-4 gear range position 19. FIG. 6 shows a sectional view of the inhibitor 10 with the select lever 16 in the 1-2 gear range position 18 and a shift lever 20 in the neutral position 21.

The sequence of shifting from neutral to first to second gear begins in FIG. 1 with the shift 20 lever in the neutral position 21 and the select lever 16 in the 1-2 gear range position 18. The inhibitor 10 does not restrict the positioning of the shift lever 20 here. This orientation of the elements occurs after the select lever 16 has been moved into the 1-2 gear range position 18 from another gear range position, such as the 3-4 gear range position 19.

Figure 2:
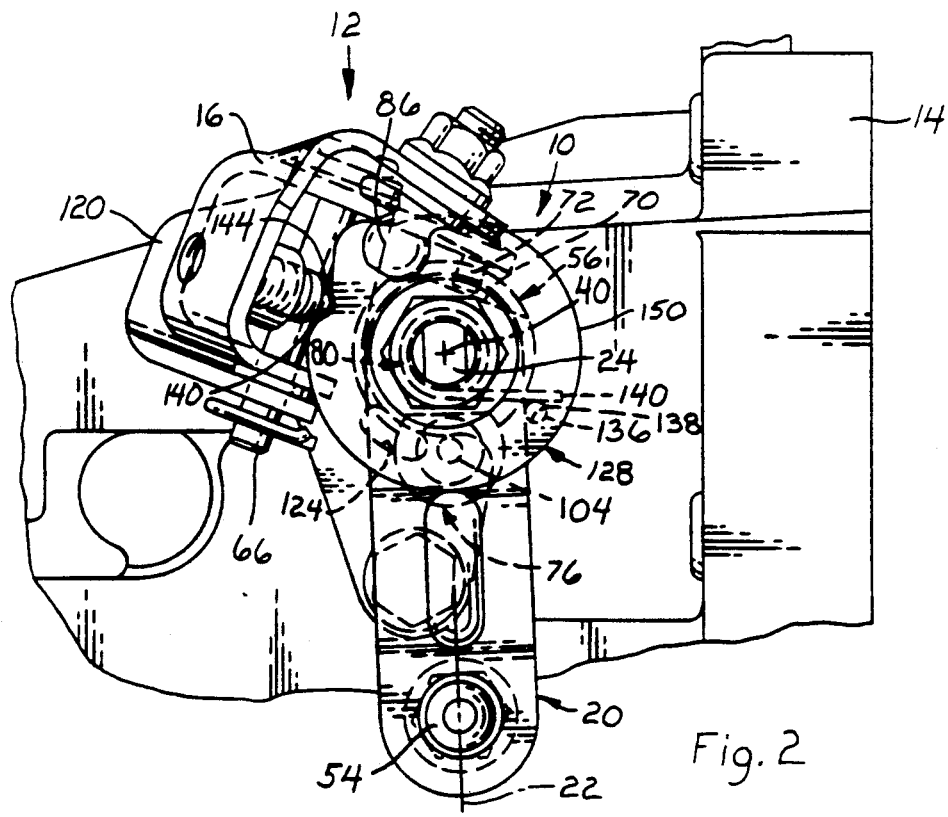
Figure 3:
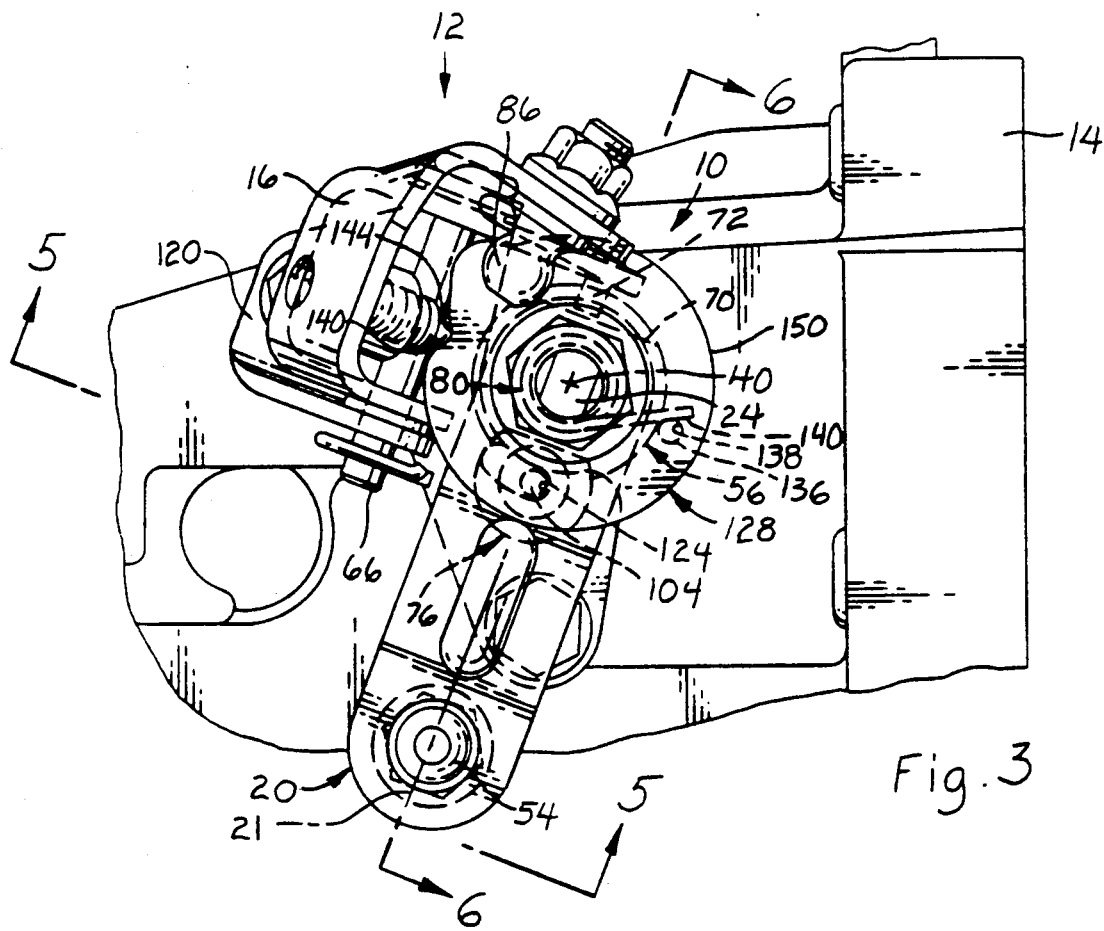
Figure 4:
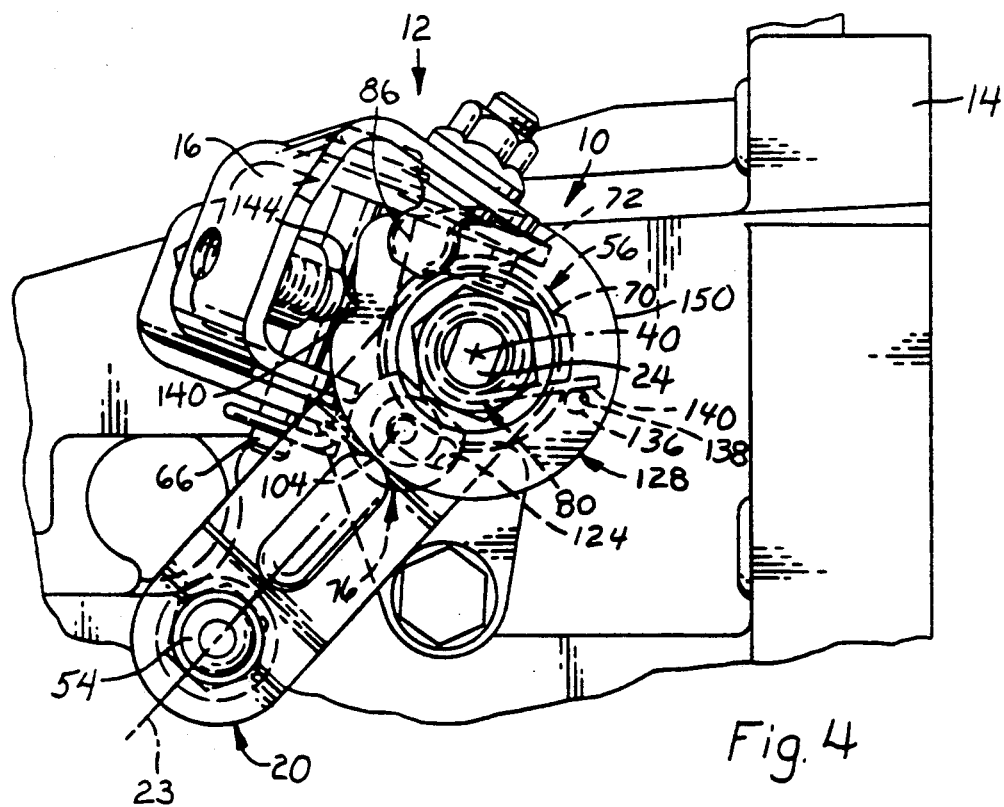

In FIG. 2 the shift lever 20 has been moved to the first gear position 22. In FIG. 3, the shift lever has been moved to the neutral position 21 on its way into the second gear position 23 shown in FIG. 4. When the shift lever is moved from the first gear position 22 to the neutral position 21, the shift lever 20 is linked to the select lever 16, thereby inhibiting movement of the shift lever 20 back toward the first gear position 22. FIG. 4 shows the shift lever 20 after it has been moved to the second gear position 23. Even when the shift lever 20 is linked to the select lever 16, there is no restriction in moving the shift lever 20 between the second gear position 23 and neutral. Rotating the shift lever 20 from the second gear position 23 to the neutral position 21 causes the relative orientation of the elements in FIG. 3 to be duplicated. The inhibitor 10 blocks any further movement of the shift lever 20 toward the first gear position 22. To shift into first gear, the select lever 16 must first be moved out of the 1-2 gear range position 18 to another gear range position such as the 3-4 gear range position 19 and then back into the 1-2 gear range position, returning the components to the orientation seen in FIG. 1.

FIG. 6 shows a sectional side view of the inhibitor 10 and a shift shaft 24 interfacing with one type of gear selection/engagement means 26. The gear selection/engagement means 26 shown is similar to that shown in U.S. Pat. No. 4,174,644 to Nagy et al. on Nov. 20, 1979 and assigned to the assignee of this invention. The gear selection/engagement 26 means includes the shift shaft 24 and a shifter paddle 25 and gear engagement means 28, 30, and 32.

The gear selection/engagement means 26 is used to select a desired gear range 34, 36, or 38 and to engage a desired gear (not shown) within the transmission housing. The gear ranges 34, 36, and 38 are the axial positions of the shift shaft 24 which permit engagement of a selected gear engagement means 28, 30, 32. For this embodiment, there is a 1-2 gear range 34, a 3-4 gear range 36, and a 5-R gear range 38.

Gear range 34, 36, 38 selection is accomplished by axial positioning of the shift shaft 24 along a longitudinal axis 40 of the shift shaft 24. Engagement of gears (not shown) within the transmission housing 14 is accomplished by rotating the shift shaft 24 about the longitudinal axis 40 to displace the selected gear engagement means 28, 30, 32.

The shift shaft 24 has a proximal end 42 which remains inside the transmission housing 14 and a distal end 44 which remains outside the housing 14. The transmission housing 14 rotatably supports the shift shaft 24, allowing the shift shaft 24 to both rotate and axially translate relative to the transmission housing 14.

Each of the gear engagement means 28, 30, and 32 have a shift fork (not shown) and a pair of lugs 46, 48 and 50. The gap (not shown) between the lugs is a shift gate. The gear engagement means 28, 30, and 32 are positioned so that their respective lugs 46, 48, and 50 are located in close proximity to one another as seen in FIG. 6. The gear selection/engagement means 26 shown in FIG. 6 has the 1-2 shift gate lugs 46 on the bottom, the 3-4 shift gate lugs 48 in the middle, and the 5-R shift gate lugs 50 on the top. Only one of each pair of lugs 46, 48, and 50 for each gear engagement means 28, 30, and 32 are shown in the sectional view of FIG. 6 to illustrate the relationship of the lugs 46, 48, and 50 to the shifter paddle 25.

The shifter paddle 25 is rotatively and axially fixed to the shift shaft 24. Each pair of lugs 46, 48, and 50 of the gear engagement means 28, 30, and 32 is disposed for engagement with the shifter paddle 25. Selection of the appropriate gear engagement means 28, 30, and 32 is made by moving the shift paddle 25 to the shift gate corresponding to the desired gear range 34, 36, 38. The shift paddle 25 is moved to the desired shift gate by rotating the select lever 16 to axially displace the shift shaft 24. Movement of the shift shaft 24 between gear ranges 34, 36, 38 can only occur with the shift lever 20 in the neutral position 21 where none of the gears are engaged. The neutral position 21 of the shift lever 20 is independent of the axial position of the shift lever 20 and the shift shaft 24. The neutral position 21 of the shift lever 20 and shift shaft 24 is their rotative position approximately midway between the first gear shift lever 22 position and the second gear shift lever position 23.

Rotary displacement of the shift shaft 24 causes the shifter paddle 25 to displace the lug 46, 48, 50 contacted, thereby displacing the corresponding gear engagement means 28, 30, 32 and shifter fork (not shown), moving a corresponding gear (not shown) or sleeve (not shown) in the same direction.

The shift lever 20 is rotatively mounted to the shift shaft 24, near the distal end 44 of the shift shaft 24. The shift lever 20 has a ball stud 54 mounted to it serving as means for connecting the lever 20 to a transmission shifter (not shown). A suitable shifter and connecting cables are shown in U.S. Pat. No. 4,143,560 issued Mar. 13, 1979 to Kinkade et al. and assigned to the assignee of this invention.

A transmission shift shaft collar 56 is fixed to the transmission shift shaft 24 intermediate between the shift lever 20 and the transmission housing 14. The shift shaft collar 56 is annular in shape. As shown in FIG. 6, the collar 56 has an inside surface 58, an outside surface 60, a top side 62 and a bottom side 64. The inside surface 58 facilitates placement of the shift shaft collar 56 over the shift shaft 24 and fixing to the shift shaft 24. The collar 56 is fixed to the shift shaft 24 by a shear pin 66 which passes through aligned apertures 68 in both the collar 56 and the shift shaft 24. The pin 66 is retained by an interference with the aperture 68 in the shift shaft 24. The outside surface 60 is largely defined by a diameter concentric with the inside surface 58, but has an engagement channel 70 traversing the outside surface 60 equidistant between the top side 62 and the bottom side 64 for slidable engagement with a stub pin 72 of the select lever 16. There is also an engagement groove 74 in the outside surface 60 of the collar 56, from the top side 62 to the bottom side 64, located approximately opposite the engagement channel 70, for slidable engagement with a shift lever detent plunger housing 76. The shift shaft collar 56 also has an aperture 78 in the top side 62 for retaining a lower end 82 of a shift lever cam spring 80.

The select lever 16 is rotatively mounted to the transmission housing 14. The stub pin 72 of the select lever 16 slidably engages the engagement channel 70 of the transmission shift shaft collar 56. When the select lever 16 is rotated, the stub pin 72 is arcuately displaced about a center of rotation 84 of the select lever 16. The stub pin 72 slidably translates across the engagement channel 70 of the collar 56 while slidably displacing the collar 56, and thereby the shift shaft 24, along the longitudinal axis 40 of the shift shaft 24. The select lever 16 also has a ball stud 86 as means for connecting the lever 16 to the transmission shifter (not shown). The select lever 16 also has a select lever detent plunger housing 88 formed integral with the select lever 16.

The shift lever detent plunger housing 76 is fixed to the shift lever 20. The detent plunger housing 76 slidably engages the engagement groove 74 of the transmission shift shaft collar 56 parallel to the longitudinal axis 40 of the shift shaft 24. The detent plunger housing 76 imparts rotary motion to the shift shaft 24 with rotary movement of the shift lever 20. The housing 76 is tubular in shape with an inside diameter 90 and an outside diameter 92 as shown in FIG. 6. The housing 76 has an upper end 94 and a lower end 96. The upper end 94 of the detent plunger housing 76 is fixed to the shift lever 20.

Disposition of a top detent plunger 98 and a bottom detent plunger 100 within the shift lever detent plunger housing 76 is accommodated by the inside diameter 90 of the detent plunger housing 76. The upper end 94 of the housing 76 is closed except for an orifice 102 to accommodate the passage of a nub 104 of the top detent plunger 98 through the upper end 94. The lower end 96 is open, accommodating installation of the detent plungers 98 and 100. The lower end 96 of the select lever detent plunger housing 88 has a slot 106 on the inside diameter 90 to accommodate a snap ring type retainer 108 for the detent plungers.

The bottom detent plunger 100 is slidably disposed within the shift lever detent plunger housing 76. The bottom detent plunger 100 is tubular in shape, with an inside diameter 110 and an outside diameter 112. The bottom detent plunger 100 is open on an upper end 114 and closed on a lower end 116. The bottom detent plunger 100 also has a nub 118 on the lower end 116 which impinges against the select lever bracket 120 when the select lever 16 is placed in the 1-2 gear range position 18.

The top detent plunger 98 is slidably disposed within the bottom detent plunger 100. The top detent plunger 98 is cylindrical in shape with an outside diameter 122 less than the inside diameter 110 of the bottom detent plunger 100. The top detent plunger nub 104 protrudes from the upper end 94 of the shift lever detent plunger housing 76 for engagement with an arcuate slot 124 in a bottom side 126 of a shift lever cam 128.

A top detent plunger spring 130 is functionally interposed between the top detent plunger 98 and the bottom detent plunger 100 to sustain compressive loads between the plungers 98 and 100. The top detent plunger spring 130 is disposed within the inside diameter 110 of the bottom detent plunger 100.

A bottom detent plunger spring 131 is functionally interposed between the shift lever detent plunger housing 76 and the bottom detent plunger 100 to sustain compressive loads between the plunger housing 76 and the bottom detent plunger 100. The spring 131 is disposed within the inside diameter 90 of the shift lever detent plunger housing 76.

A bushing 132 retains and provides a centering pilot 134 for the shift lever cam 128. The bushing 132 is fixed axially and rotatively to the distal end 44 of the shift shaft 24. The bushing 132 is selectively removable from the shift shaft 24.

A cam pin 136 is fixedly inserted in an orifice 138 in the bottom side 126 of the cam 128 as shown in FIG. 5. When the top detent plunger 98 of the shift lever 20 is disengaged from the cam 128, the cam 128 is positioned by an upper end 140 of the shift lever cam spring 80 pressing the cam pin 136 against the shift lever 20.

A select lever detent plunger 142 is disposed within the select lever detent plunger housing 88. The select lever detent plunger 142 and the detent plunger housing 88 together engage a cam detent surface 144 of the shift lever cam 128 when the shift lever 20 has been in the first gear position 22 while the select lever 16 has been in the 1-2 gear range position 18.

The shift lever cam spring 80 provides a torsional spring load to the cam 128 through the cam pin 136. The lower end 82 of the shift lever cam spring 80 is parallel to the longitudinal axis 40 of the shift shaft 24 and is inserted into the aperture 78 in the top side 62 of the shift shaft collar 56. The upper end 140 of the shift lever cam spring 80 extends out away from the shift shaft axis 40 in a plane perpendicular to the axis 40 for rotatably engaging the cam pin 136.

The relationship between the cam 128 and the select lever detent plunger 142 can be seen in illustrations 1-5. They show how when the select lever 16 is in the 1-2 gear range position 18, the detent plunger 142 engages the cam 128.

The shift lever cam 128 is mounted on the shift shaft 24 distal of the shift lever 20 and rotatively pilots on the bushing 132. The shift lever cam 128 is annular in shape with a central opening 148 of a constant diameter, providing a clearance fit to the bushing pilot 134. The cam 128 is rotatable about the longitudinal axis 40 of the shift shaft 24. The cam 128 has an outer wall 150 with the cam detent surface 144. The cam 128 also has an orifice 138 in the bottom side of the cam accommodating the fixed insertion of the cam pin 136. The arcuate slot 124 in the bottom side 126 of the cam 128 accommodates engagement with the nub 104 of the top detent plunger 98.

This invention and the interrelationship of the parts can be more clearly understood by observing the sequence of operations of the device.

On a shift into first gear from any other gear, except immediately following a 1-2 shift, the operation of the shift control 12 is much the same as with any conventional shift control. When, with the shift lever 20 in the neutral position 21, the select lever 16 is moved into the 1-2 gear range position 18 from another gear range position such as the 3-4 gear range position 19, the select lever detent plunger 142 impinges on the outer wall surface 150 of the cam as seen in FIG. 1. With the select lever 16 in the 1-2 gear range position 18, and the shift lever 20 in the neutral position 21, the cam 128 is not yet linked or engaged with the shift lever 20 by the top detent plunger nub 104. When the select lever 16 moves into the 1-2 gear range position 18, the bottom detent plunger 100 in the shift lever detent plunger housing 76 is pressed upward by contact with the select lever mounting bracket 120. The top detent plunger nub 104 is pressed upward against the bottom side 126 of the cam 128. The cam 128 is rotatively positioned relative to the shift lever 20 by contact of the upper end 140 of the shift lever cam spring 80 with the cam pin 136. The cam spring 80, when viewed from the distal end 44 of the transmission shift shaft 24, maintains a clockwise torque against the cam pin 136. The upper end 140 of the spring 88 is indexed counter clockwise relative to the bottom end of the spring 82 which in inserted in the top side 62 of the transmission shift shaft collar 56. The cam pin 136, and therefore the cam 128, are held rotatively fixed relative to the shift lever 20 by the clockwise torque provided by the spring 80.

The shift lever 20 is rotated to the first gear position 22 causing the shifter paddle 25 to displace the lugs 46 on the gear engagement means 28, thereby displacing the gear engagement means 28, engaging first gear. As the shift lever 20 is moved counter clockwise into the first gear position 22, the cam 128 rotates with the shift lever 20 because of the contact between the cam pin 136 and the shift lever 20. As the shift lever 20 enters the first gear position 22, the select lever detent plunger 142 engages the detent surface 144 of the cam 128.

When the shift lever 20 is in the first gear position 22, the cam 128 is located such that the select lever detent plunger 142 impinges on the cam detent surface 144. When engaged by the select lever detent plunger 142 and the detent plunger housing 88, the cam 128 is blocked from rotating in a counter clockwise direction and is restricted from moving in the clockwise direction by the select lever detent plunger 142. The clockwise restriction provided by the select lever detent plunger 142 impinging on the cam detent surface must be sufficient to prevail against a combination of both the torsional spring load of the shift lever cam spring 80 against the cam pin 136 and a frictional drag load on the cam 128 from the nub 104 of the top detent plunger 98 pressing against the bottom side 126 of the cam 128, so that the cam 128 will not be displaced in the clockwise direction as the shift lever 20 is moved from the first gear position 22 toward second gear.

When the shift lever 20 reaches the neutral gear position as it is moved from the first gear position 22 to the second gear position as shown in FIG. 3, FIG. 5, and FIG. 6, the top detent plunger 98 is aligned with the counterclockwise end of the arcuate slot 124 in the bottom side 126 of the cam 128, allowing the top detent plunger nub 104 to travel up into the arcuate slot 124, engaging the shift lever 20 with the cam 128.

As the shift lever 20 is moved into the second gear position it encounters no resistance from the inhibitor. The nub 104 travels along the arcuate slot 124 and the cam 128 continues to be held rotatively fixed by the select lever detent plunger 142. FIG. 4 shows the shift inhibitor 10, the select lever 16, and the shift lever 20 in their second gear positions.

When the shift lever 20 is moved from second gear position back toward the first gear position 22, the top detent plunger nub 104 moves with the shift lever 20, traveling within the arcuate slot 124 in the bottom side 126 of the cam 128. The cam 128 continues to be rotatively engaged with the select lever 16 with the select lever detent plunger housing 88 blocking displacement of the cam 128 in the counter clockwise direction. The travel of the shift lever 20 is blocked at the neutral gear position by the nub 104 of the top detent plunger 98 reaching the counterclockwise end of the arcuate slot 124. The shift lever 20 is restrained from moving back into the first gear position 22. The orientation of the elements is the same as that shown in FIG. 3, FIG. 5, and FIG. 6.

To release the inhibitor 10, allowing shifting into first gear, the select lever 16 must be rotated from the 1-2 gear range position 18 to the 3-4 gear range position 19 or the 5-R gear range position (not shown), thereby releasing the cam 128.

When the select lever is moved from the 1-2 gear range position 18 to another gear range position, two things happen simultaneously to release the cam 128: first, the shift shaft 24 moves up as the select lever 16 is rotated, moving the shift lever 20 away from the transmission housing 14 and allowing the top detent plunger 98 to recede into the shift lever detent plunger housing 76 thereby disengaging the cam 128 from the shift lever 16, and second, the select lever detent plunger housing 88 allowing the cam 128 to once again freely rotate relative to the transmission housing 14. Once the cam 128 is fully released, the shift lever cam spring 80 again pushes the cam pin 136 against the shift lever 20, the same relative orientation of parts which this description began with, as seen in FIG. 1.

The embodiments of the invention in which an exclusive property or privilege is claimed are defined as follows:

1. An inhibitor for a manual transmission shift control for a manual transmission having a plurality of drive gears including a first gear and a second gear as well as neutral where no drive gears are engaged, the shift control having corresponding positions, including a first gear position, a second gear position, and a neutral position, the inhibitor comprising means for inhibiting the shift control only from entering the first gear position only when the shift control is being shifted toward the first gear position through the neutral position as the next shift after being shifted from the first gear position through the neutral position to the second gear position, the means being located on an exterior of a transmission housing.

2. An inhibitor for a manual transmission shift control as described in claim 1, completely mechanical in operation.

3. An inhibitor for a manual transmission shift control for a manual transmission having a plurality of drive gears including a first gear and a second gear as well as neutral where no drive gears are engaged, located on the exterior of a transmission housing, blocking a shift into the first gear sequentially following a shift from the first gear to the second gear, the shift control including a shift shaft for selecting and displacing a gear engagement means within a transmission housing, the shift shaft having a longitudinal axis which is a center of rotation of the shift shaft and along which the shift shaft is slidably disposed, the shift shaft having a proximal end retained within the transmission housing and a distal end remaining outside of the transmission housing, the shift control also including a shift lever for rotatively displacing the shift shaft about the longitudinal axis and selectively rotatable between a first gear position, a neutral position, and a second gear position, the shift lever mounted to the distal end of the shift shaft, the shift control further including a select lever rotatively mounted relative to the transmission housing and providing a stub pin and selectively rotatable to a 1-2 gear range position, the shift control even further including means for slidably engaging the stub pin of the select lever and is fixedly engaged to the shift shaft, with rotative motion of the select lever producing axial displacement of the shift shaft, the inhibitor comprising:

means for restricting movement of the shift lever when the select lever is in the 1-2 gear range position; and means for releasing the shift lever by rotating the select lever from the 1-2 gear range position.

4. An inhibitor for a manual transmission shift control for a manual transmission having a plurality of drive gears including a first gear and a second gear as well as neutral where no drive gear is engaged, located on the exterior of a transmission housing of the manual transmission, inhibiting the shift control from being shifted to the first gear from the second gear when the preceding shift was from the first gear to the second gear, comprising:

shift shaft means for selecting and displacing a gear engagement means within the transmission housing, having a longitudinal axis which is a center of rotation of the shift shaft, slidably disposed along the longitudinal axis, having a proximal end retained within the transmission housing, having a distal end remaining outside of the transmission housing;

a shift lever means for rotatively displacing the shift shaft means about the longitudinal axis, mounted on the shift shaft means near the distal end of the shift shaft means, selectively rotatable between a first gear position, a neutral position, and a second gear position;

a transmission shift shaft collar, annular in shape with an inside surface, an outside surface, a top side and a bottom side, circumscribing and fixed to the transmission shift shaft means intermediate between the shift lever means and the transmission housing, having the inside surface facilitating placement over and fixing to the shift shaft means, having the outside surface defined by a diameter concentric with the inside surface with a stub pin engagement channel traversing the outer wall equidistant between the top side and the bottom side for slidably engaging a stub pin of select lever means, having an aperture in the top side retaining a lower end of a shift lever cam spring, and having an engagement groove the height of the collar from the top end to the bottom end for slidable engagement with a shift lever detent plunger housing;

the select lever means, rotatively mounted to the transmission housing, having the stub pin for slidably engaging the engagement channel of the transmission shift shaft collar, selectively rotatable to a 1-2 gear range position, slidably displacing the shift shaft means along the shift shaft longitudinal axis through the stub pin means when rotated, having an integral select lever detent plunger housing;

the shift lever detent plunger housing, tubular in shape with an inside diameter and an outside diameter, an upper end and a lower end, for the disposition of a top detent plunger and a bottom detent plunger, being fixed to the shift lever means on the upper end, slidably engaged with the engagement groove of the transmission shift shaft collar parallel to the longitudinal axis of the shift shaft means, imparting rotary motion to the shift shaft means with rotary movement of the shift lever means, having the upper end at the shift lever means closed except for an orifice to accommodate the passage of a nub of the top detent plunger through the upper end, having the lower end open to accommodate installation of the detent plungers, and having means on the lower end for retaining the detent plungers while allowing a nub on the bottom end of the bottom detent plunger to protrude;

the bottom detent plunger, being slidably disposed within the shift lever detent plunger housing, being tubular in shape with an inside diameter and an outside diameter, open on an upper end, being closed on a lower end, having a nub on the lower end impinging against a surface fixed relative to the transmission housing only when the select lever means is in the 1-2 gear range position, being displaced upward relative to the shift lever detent plunger housing when impingement occurs;

the top detent plunger, being slidably disposed within the bottom detent plunger, being cylindrical in shape with an outside diameter less than the inside diameter of the bottom detent plunger, having the nub press upward from an upper end for engagement with an arcuate slot in a bottom side of a shift lever cam when the bottom detent plunger is displace upward;

a top detent plunger spring functionally interposed to sustain compressive loads between the top detent plunger and the bottom detent plunger;

a bottom detent plunger spring functionally interposed to sustain compressive loads between the detent plunger housing and the bottom detent plunger;

a bushing, axially fixed and rotatively fixed and selectively removable to the most distal end of the shift shaft, retaining and providing a centering pilot for the shift lever cam;

a cam pin, fixedly inserted in an orifice in a bottom side of the cam, positions the cam by being pressed against the shift lever by an upper end of the shift lever cam spring when the top detent plunger of the shift lever means is disengaged from the cam;

a select lever detent plunger, disposed within the select lever detent plunger housing, together with the housing engaging a cam detent surface of the shift lever cam in the 1-2 gear range position while the shift lever means is in the first gear position and the select lever means in the 1-2 gear range position, disposed within the select lever means;

the shift lever cam spring providing a torsional spring load to the shift lever cam through the cam pin and having the upper end and a lower end; and the shift lever cam, being annular in shape with a central opening of a constant diameter providing a clearance fit to the bushing pilot, rotatively piloting on the busing, located on the shift shaft means distal of the shift lever means, having an outer wall with the cam detent surface, having the arcuate slot in the bottom side of the cam for accommodating engagement with the nub of the top detent plunger, having the orifice in the bottom side of the cam accommodating fixedly inserting the cam pin, being rotatively positioned by contact of the cam pin against the upper end of the shift lever cam spring such that the cam pin is pressed against the shift lever means, when the top detent plunger within the shift lever detent plunger housing is disengaged, being held fixed relative to the select lever means by the select lever detent plunger impinging on the cam detent surface when the select lever means is in the 1-2 gear range position and the shift lever means is placed in the first gear position, remaining fixed by and relative to the select lever means, being engaged by the top detent plunger nub as the shift lever means enters the neutral position in shifting from the first gear position to the second gear position, being held rotatively fixed by the select lever detent plunger and the select lever detent plunger housing as the shift lever is moved from the second gear position toward the first gear position, the nub of the top detent plunger blocking travel of the shift lever when the end of the arcuate slot is reached in the neutral position, being rotatively released when the select lever moves from the 1-2 gear range position to another position, being rotated by the cam spring contact with the cam pin which pushes the cam pin against the lever, having the cam pin restrain an upper end of a shift lever cam spring as the shift lever means is moved from the first gear position toward the second gear position displacing the cam when the shift lever is moved to the neutral position and the select lever is moved out of the 1-2 gear range position.

* * * * *